US012062836B1

(12) United States Patent
Kim et al.

(10) Patent No.: US 12,062,836 B1
(45) Date of Patent: Aug. 13, 2024

(54) COMPACT MULTI-FREQUENCY ANTENNAE

(71) Applicant: Enig Associates, Inc., Rockville, MD (US)

(72) Inventors: Yil-Bong Kim, Silver Spring, MD (US); Eric N. Enig, Bethesda, MD (US)

(73) Assignee: ENIG ASSOCIATES, INC., Rockville, MD (US)

( * ) Notice: Subject to any disclaimer, the term of this patent is extended or adjusted under 35 U.S.C. 154(b) by 0 days.

(21) Appl. No.: 18/532,010

(22) Filed: Dec. 7, 2023

Related U.S. Application Data

(60) Provisional application No. 63/386,469, filed on Dec. 7, 2022.

(51) Int. Cl.
*H01Q 1/26* (2006.01)
*H01J 25/02* (2006.01)

(52) U.S. Cl.
CPC .................................... *H01Q 1/26* (2013.01)

(58) Field of Classification Search
CPC . H01J 25/02; B01J 25/34; B01J 25/36; H01Q 1/26; H01Q 1/38
See application file for complete search history.

(56) References Cited

U.S. PATENT DOCUMENTS

| | | | | | |
|---|---|---|---|---|---|
| 2,597,303 | A * | 5/1952 | Dicke | G01R 19/0076 | 324/120 |
| 3,707,647 | A * | 12/1972 | Rawls, Jr. | H01J 23/50 | 315/39.53 |
| 5,233,269 | A * | 8/1993 | Lien | H01J 25/02 | 315/5.44 |
| 5,572,092 | A * | 11/1996 | Shrader | H01J 23/54 | 315/5.37 |
| 5,835,062 | A * | 11/1998 | Heckaman | H01Q 3/46 | 343/840 |
| 7,719,471 | B1 * | 5/2010 | Pavliscak | H01Q 3/44 | 343/701 |

* cited by examiner

*Primary Examiner* — Tho G Phan
(74) *Attorney, Agent, or Firm* — BROWDY AND NEIMARK, P.L.L.C.

(57) ABSTRACT

A transmitting antenna includes a first and a second vacuum tube. Each respective vacuum tube includes at least a grounded cathode, a control grid that receives a respective a respective signal, and a plate electron collector. A first spherical ball is connected by a first conducting wire to the plate electron collector of the first vacuum tube. A second spherical ball connected by a second conducting wire to the plate electron collector of the second vacuum tube. Output of the transmitting antenna is produced by an electromagnetic wave that is radiated from conduction current in each of the first and second conducting wires. In another aspect of the invention, first and second spherical balls are connected by conducting wires to the collectors of respective charged particle beam vacuum tubes in which a charged particle beam gun produces a beam of finite length of electrons or ions within the vacuum tube that moves within the vacuum tube at a controlled speed to generate an electromagnetic wave.

20 Claims, 15 Drawing Sheets

COMPACT MULTI-FREQUENCY ANTENNAE

BACKGROUND OF THE INVENTION

The present invention pertains to innovative technologies of compact low-frequency transmitters in the VLF (3-30 KHz), LF (30 kHz-300 kHz), MF (300 kHz-3 MHz), HF (3 MHz-30 MHz), VHF (30 MHz-300 MHz), and UHF (300 MHz-3000 MHz) spectrum, and more specifically pertains to compact low-frequency transmitters with an antenna size significantly smaller than the wavelength of the carrier wave. VLF transmitters will be used as an example herein, but the fundamental concept and technology introduced here can be applied to higher frequency bands including LF, MF, HF, VHF, and UHF.

Sensitive and compact commercial receivers that can measure the spectral noise density of 10 fT/√Hz magnetic signals in the VLF spectrum already exist. See, for example, Zonge International, "Magnetic Sensors," 2016. The natural noise in this spectrum is also below this level. See, for example, [1] E. L. Maxwell and D. L. Stone, "Natural Noise Fields 1 cps to 100 kc", IEEE Transactions on Antennas and Propagation, May 1963.

A baseline receiver with less than 10 fT/√Hz noise and clutter floor will be assumed in any estimates for VLF transmitter applications according to the invention. Radio frequencies at the very low-end of the electromagnetic spectrum are attractive for numerous defense and civilian applications for long-range two-way communications, as well as geophysical detection, interrogation, and exploration, in conductive media (e.g., underground and undersea). VLFs are particularly useful for the penetration of signals through conductive media such as soil, rock, water, and building materials. Penetration is possible due to the relatively large skin depth in these materials, which grows as the carrier frequency is reduced. Currently, for undersea communications, VLF is used for one-way communication to a submarine from a very large land-based VLF antenna that typically occupies 100s of square miles of land area.

BRIEF SUMMARY OF THE INVENTION

One aspect of the invention provides a compact transmitting antenna that includes a vacuum tube, a charged particle beam gun, a beam timing controller, and a beam speed controller. The charged particle beam gun is positioned for producing a beam of finite length of electrons or ions within the vacuum tube that moves within the vacuum tube at a controlled speed to generate an electromagnetic wave. The beam timing controller is arranged to control at least an on time and an off time of the beam. The beam speed controller is arranged to control the speed of the beam within the vacuum tube. A frequency modulator is provided by the compact transmitting antenna, arranged to modulate the beam for carrying voice or data signals to transmit information from the compact transmitting antenna.

In certain embodiments, the charged particle beam gun includes a cathode and an anode. The beam speed controller can be the anode of the charged particle beam gun, which controls the speed of the beam within the vacuum tube according to a voltage applied to the anode. Alternatively, the beam timing controller can be a control grid positioned relative to the cathode and the anode of the charged particle beam gun to turn on and off the beam and control an amount of beam current by a voltage applied to the control grid.

The beam speed controller can include a source of an external magnetic field. The beam speed can be controlled by angled injection of the charged particle beam into the vacuum tube under an axial magnetic field.

The frequency modulator can include the beam timing controller or the beam speed controller.

The vacuum tube can have a cylindrical shape, and a collector at an end of the cylindrical vacuum tube opposite to the charged particle beam gun can collect modulated charged particles. The collector is configured to cause the modulated charged particles to be sent back to the beam gun. In certain embodiments, the compact transmitting antenna can further include a second vacuum tube, having another charged particle beam gun positioned for producing a beam of finite length of electrons or ions within the vacuum tube, and having another collector at an end of the other vacuum tube opposite to the charged particle beam gun, the second vacuum tube being parallel to the first vacuum tube but oriented for the charged particle beam to travel in a direction opposite to travel of the charged particle beam in the first vacuum tube. A phase splitter circuit can be configured to control alternating beam injection by the charged particle beam guns of the first and second vacuum tubes. The phase splitter circuit can be the frequency modulator.

The particle beam antenna having first and second vacuum tubes can be enhanced by the two collectors being respectively connected to two conductive spherical balls by conducting wires. In this enhancement, the output of the antenna due to beam current convection is enhanced by an electromagnetic (EM) wave that is radiated from the conduction current in each wire during the charge transfer from the collector to the conductive spherical ball. A shielding cup covers the collector and charged particle beam gun at each respective end of the particle beam antenna. The purpose of a shielding cup is to distribute electric charges outside of the cup and make the internal electric field go to zero, so that an electron beam is not reflected from the collector during charge accumulation. The spherical balls and the shielding cups are coated with a high-breakdown-voltage dielectric, to avoid corona discharge and electrical breakdown.

The vacuum tube can have a toroidal shape. The charged particle beam gun can be positioned for producing a beam of finite length of electrons or ions within the vacuum tube that moves within the vacuum tube at a controlled speed in a circle back to the position of the charged particle beam gun, which can cause the beam to accumulate additional charged particles by injecting current in a synchronized way. Certain embodiments can feature a phased array antenna formation that includes a plurality of such compact transmitting antennae, the phased array antenna formation being configured to generate very long-range directional radiation for far-field radiation applications.

The charged particle beam gun in combination with the beam timing controller and the beam speed controller can be configured for producing a beam that moves to generate RF electromagnetic waves, or for producing a beam that moves to generate electromagnetic waves ranging from very low frequency to ultra-high frequency.

The vacuum tube can be filled with background plasma to neutralize a space charge of the beam to increase emitted beam current.

In certain embodiments, the compact transmitting antenna can be combined with a very sensitive receiver to form a two-way communication system for undersea, underground, or free-space communications, or with a very sensitive underground or undersea very low frequency GPS receiver for RF-denied assured/alternate position, navigation, and timing applications, or with a very sensitive underground or undersea EM sensor for imaging and characterization of subsurface or underwater conductive media.

The invention provides a compact transmitter system that in certain embodiments has a volume of 100 cm×10 cm×10 cm and an approximate weight of 40-60 lbs. and consumes low power to transmit a 1 picoTesla magnetic field signal in free-space up to 1 km distance, undersea down to 40 m, and underground down to 500 m. A toroidal electric dipole antenna that is scalable to much higher output power is also disclosed.

The invention can provide a very compact (e.g., briefcase-size) two-way VLF communication system using a charged particle beam (e.g., electron or ion) vacuum tube VLF transmitter. Another main advantage of the charged particle beam plasma VLF transmitter is broadband capability. Conventional electrically small antennas have a very limited bandwidth, constrained by fundamental physics when the current in the antenna travels with the speed of light. When the speed of the current in the antenna can be manipulated for any long-wavelength electromagnetic wave, the bandwidth and the data throughput can be drastically increased. This is the case in the charged particle beam antenna where the current is carried by charged particle beams whose speed is controllable with beam acceleration voltage and applied electromagnetic field.

Three different embodiments (i.e., designs) are described herein: monopolar, bipolar, and toroidal vacuum tube charged particle beam antennas for VLF, LF, MF, HF, VHF, and UHF transmitting antenna.

The invention provides a very compact VLF, LF, MF, HF, VHF, and UHF transmitter based on a linear electric dipole transmitter using modulated charged particle (electron or ion) beams in a vacuum tube. This technology can demonstrate an integrated, self-contained, compact VLF transceiver system for underground and undersea two-way communication with sufficient bandwidth for voice and data transmission with readily available compact VLF receivers.

The concept of a VLF transmitter according to the invention is based on the very fundamental physics of a linear electric dipole antenna using modulated charged particle beams in a vacuum tube. Currently available closed (i.e., circular or square) magnetic loop dipoles emit weak magnetic field signals that decay as $1/r^3$ in the near-field. On the contrary, a linear electric dipole antenna emits magnetic field signals that decay as $1/r^2$ in the near-field. See e.g., [2] Constantine A. Balanis, "Antenna Theory: Analysis and Design, 4th Edition", ISBN: 978-1-118-64206-1 Feb. 2016.

The fundamental concept behind a compact VLF antenna transmitter according to the invention is based on the fact that a linear small electric dipole antenna can generate a far-reaching magnetic signal, because of the $1/r^2$ attenuation of the near-field in free-space. Moreover, the current in the antenna is directly driven by a charged particle beam (i.e., electron or ion) injection with an electron or ion gun so the current in the antenna can be orders of magnitude higher than a conventional conductive wire antenna with a current driving circuit. When the conventional antenna length is significantly shorter than the wavelength of the transmitting wave, the impedance of the antenna and feed do not match well. Therefore, the current in the conventional conductive wire antenna is very low and the radiation power and near-field signal strength are also very low. A compact transmitter according to the invention, however, does not require an antenna feed with impedance matching.

Electrically small antenna (ESA) with an antenna size significantly smaller than wavelength has a fundamental bandwidth and efficiency limit that is called Chu limit in antenna theory (see e.g., L. J. Chu, "Physical limitations of omni-directional antennas," Journal of Applied Physics, vol. 19, no. 12, pp. 1163-1175, 1948. However, the bandwidth of antennae according to the invention is not limited by the fundamental ESA (electrically small antenna) limit as in the conventional antenna, because the resonant frequency of the electron beam vacuum tube antenna can be controlled by manipulating the beam speed in a fixed-length vacuum tube antenna. A Tx-only, nonreciprocal antenna according to the invention violates the Chu limit and can demonstrate a 10 dB enhancement of the Chu bandwidth limit in all frequency bands, from VLF, LF, MF, HF, VHF, to UHF.

According to another aspect of the invention, a compact transmitting antenna includes, instead of particle beam tubes as described above, two vacuum tubes, a phase splitter, two conductive spherical balls, and two conducting wires. The phase splitter splits a modulated input signal into two out-of-phase signals. Each vacuum tube has at least a grounded cathode, a control grid that receives a respective one of the out-of-phase signals, and a plate electron collector. Each conductive spherical ball is connected to a plate electron collector of a respective one of the vacuum tubes by a respective one of the conducting wires. The accumulated charge in the plate electron collector is redistributed to the respective spherical ball, and an electromagnetic (EM) wave is radiated from the current in the wire during the charge transfer from the plate electron collector to the spherical ball. The frequency of this EM wave is solely controlled by an input arbitrary voltage waveform and is of any frequency, limited by electrostatic charge in the spherical ball and the grid frequency bandwidth limit. Its frequency is not limited by the conventional antenna theory where the Chu limit limits the bandwidth of the modulated waveform frequency output. Each vacuum tube can also have a screen grid that is connected to high voltage and serves as an anode to accelerate electrons from the cathode, and a suppressor grid that is grounded (which may be a floating ground) to reduce secondary electrons from the plate electron collector. Both spherical balls can be coated with a high-breakdown-voltage dielectric, to avoid corona discharge and electrical breakdown. Each vacuum tube can be enclosed by one of two electric shielding caps, to reduce the electric field inside the vacuum tube from accumulated charges on the plate electron collector. The electric shielding caps can be coated with high-breakdown-voltage dielectric material, to avoid electrical breakdown between them.

DETAILED DESCRIPTION OF THE INVENTION

Figure 1:
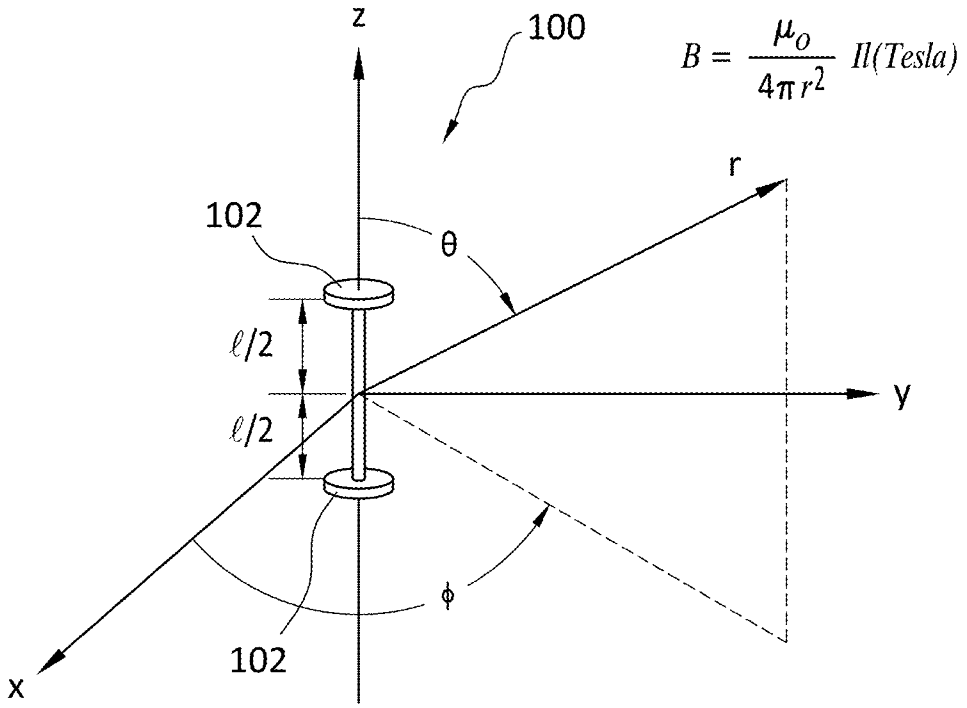
FIG. 1 is a pictorial view of a small linear electric dipole and its magnetic near-field formula on xy-plane. The antenna carries a uniform current I along length l. This is called Hertzian electric dipole.

FIG. 1 shows a small linear electric dipole configuration 100 and its near-field along an xy-plane, where dipole configuration 100 is an "infinitesimal dipole" having two end plates 102 separated by distance l, where $l \leq \lambda/50$. The displayed formula for the magnetic field strength, $B=(\mu_o/4\pi r^2)Il$ (Tesla), applies to the near-field when the distance from the antenna is less than wavelength/$2\pi$. For a VLF wave with 24 kHz, this distance is 2 km. An antenna with a length of 1 m and a current of 10 A (i.e., electric dipole moment of 10 Am) can generate a sensible 1 pT magnetic signal at 1 km in free-space. In a moderately conductive media, this range is reduced to 40 m undersea with sea conductivity of 4 Siemens/m or 500 m for underground transmission with a conductivity of 0.005 Siemens/m based on near-field electromagnetic simulation code. So, even at a 10 Am dipole moment output, it is possible to provide undersea communication within 40 m and underground communication within 500 m. Two-way, free-space-to-undersea electromagnetic communication within 40 m with a very compact transmitting antenna and receiver pair can be a game-changer in undersea communications in addition to two-way underground voice quality communication capability within 500 m.

Figure 2:
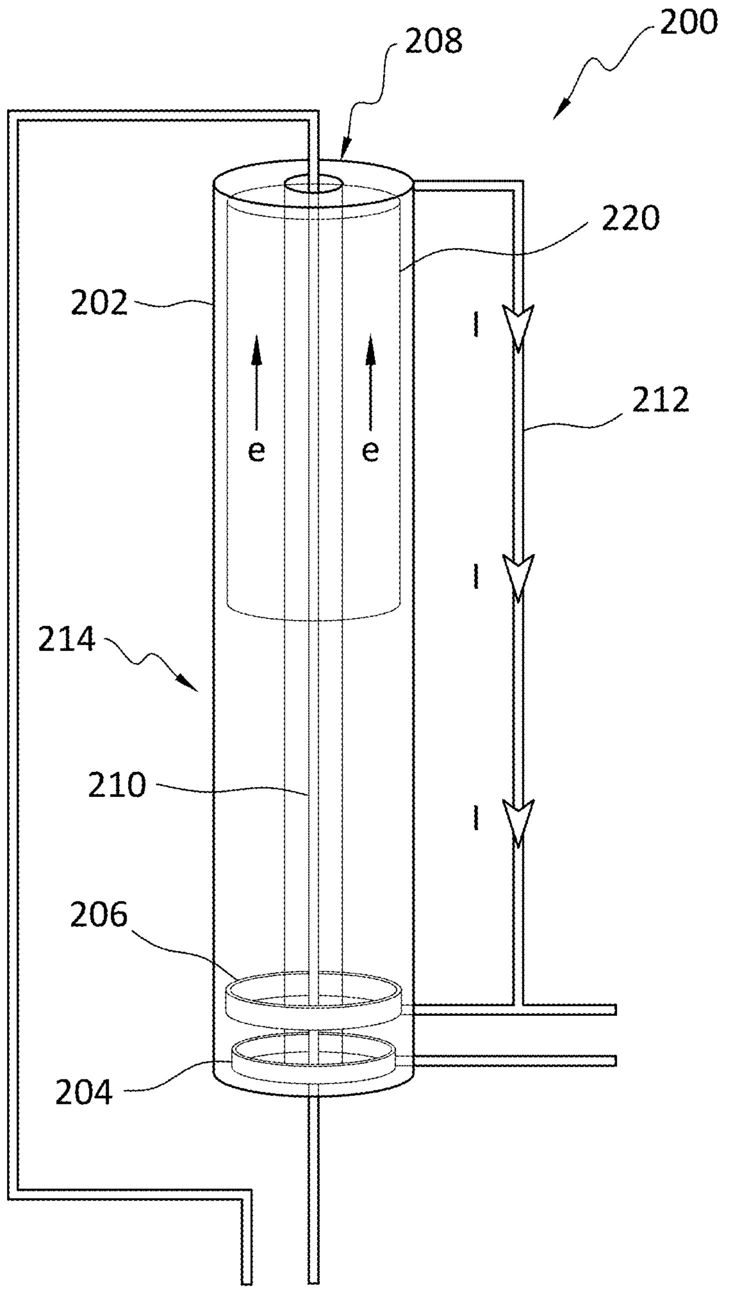
FIG. 2 is a schematic illustration of a VLF transmitter that can be used for the implementation of the present invention of the monopolar-charged particle beam plasma antenna
Figure 3:
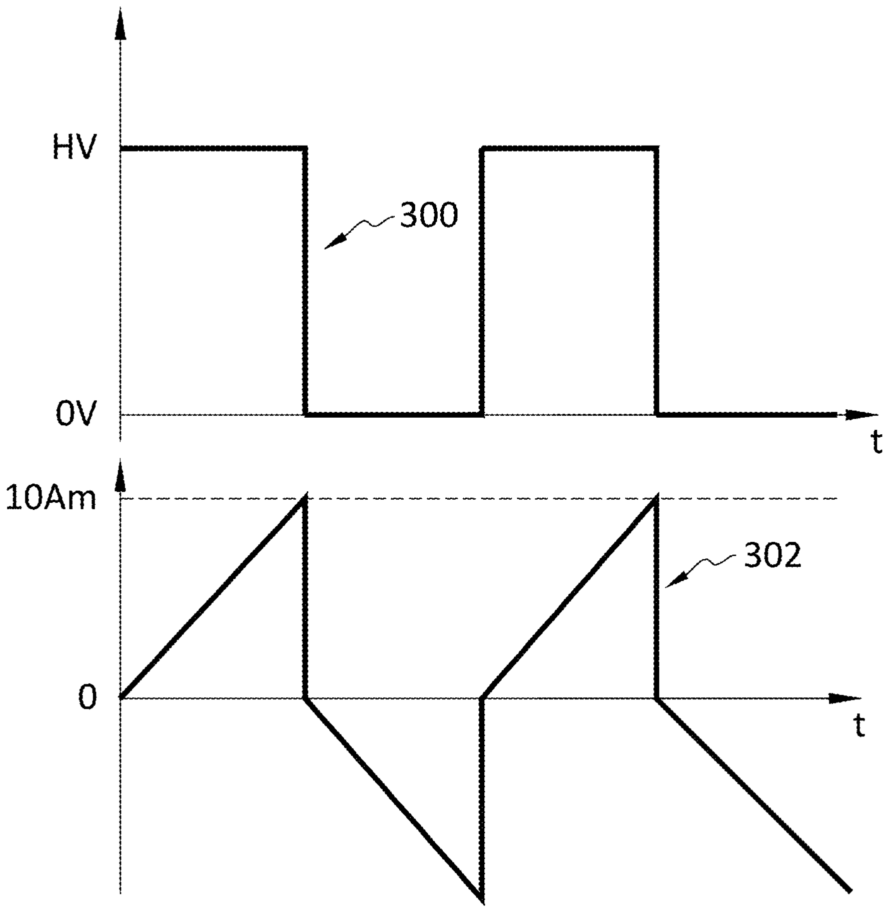
FIG. 3 is a diagram of a VLF magnetic signal output and anode or control grid voltage square wave pulse.

FIG. 2 is a conceptual drawing of various components of a VLF transmitter system 200, which is composed of an annular vacuum tube 202, an electron-emitting cathode 204 heated by a heater, an anode 206, an electron beam collector 208, a central wire 210 carrying the DC current to generate an azimuthal magnetic field to slow down electrons in vacuum tube 202, and an electron return wire 212, where a data modulation signal generator can include the wire circuit and/or anode 206. There are several variations of the antenna design; however, this one will be discussed herein as an example mainly for simplicity. The most fundamental concept is to carry antenna current by finite-length electron (or ion) beam 220 with a proper speed controlled by either anode beam voltage, central DC wire current, and/or control grid bias voltage to generate non-canceling antenna current of beam 220 and return wire current with proper beam modulation. As an example, cylindrical tube 202 can have a length of 1 m and an outer diameter of 10 cm, but numerous other options are possible. The level of vacuum is sufficiently low to improve the cathode lifetime. Also, at this level of vacuum, the electron mean free path is significantly longer than the antenna length, so electrons are collisionless. The thermionic cathode will generate electrons with a yield of 1 A/cm$^2$ or more from the cathode filament area. Center wire 210 can be a multiple bundled loop wire to carry 20 A total (e.g., 10 loops of 2 A current) and generate an azimuthal magnetic field in the tube. Electrons from thermionic cathode 204 will gyrate around the magnetic field and drift with curvature and gradient B drift velocity toward electron collector plate 208. Helical coils are necessary to confine plasma against electrostatic beam divergence, but such helical coils are not shown in FIG. 2. Another alternative way of slowing down the beam is to inject the beam into tube 202 at a tilted angle. The injected beam gyrates around the axial magnetic field that is generated by the external helical coils, so that the affected axial speed of the beam is reduced from the actual beam particle speed. Thermionic cathode 204 will emit electrons when the cathode temperature is high enough to overcome the work function of the cathode material and the anode voltage is positive. Electrons are then accelerated by anode voltage to inject beams into tube 202 within the space charge limit. Background plasma 214 may be required within tube 202 to overcome the space charge to generate a high current with a long travel distance. In technical terms, this is called beam perveance. When the anode voltage is zero, there is no electron emission due to the space charge, so the beam is turned off. A control grid between anode 206 and cathode 204 (not shown in FIG. 2) can be used to turn on and off beam 220 similar to a triode vacuum tube. The electron beam pulse duration is controlled by a control grid bias voltage with a VLF, MF, or HF frequency as shown by a unipolar square wave 300 representing voltage to the anode as shown in FIG. 3, where the x-axis represents time and the y-axis represents the driver voltage at the anode. The anode voltage is turned off when the front of the electron beam 220 reaches collector plate 208. During this time, the electric dipole moment output 302 of the vacuum tube will increase linearly, until the anode is turned off. Once the front end of the electron beam 220 reaches collector plate 208, electrons will return to the anode-cathode circuit. Technically speaking, it is an electric current that returns back with the speed of light. During this second half cycle, the electric dipole moment of the vacuum tube and the return wire will have partial cancelation until the finite length beam 220 disappears in the collector. The electric dipole moment and the resultant magnetic near-field signal will have the unipolar triangular waveform 302 as shown in FIG. 3, where the x-axis represents time and the y-axis represents the dipole moment.

Figure 4A:
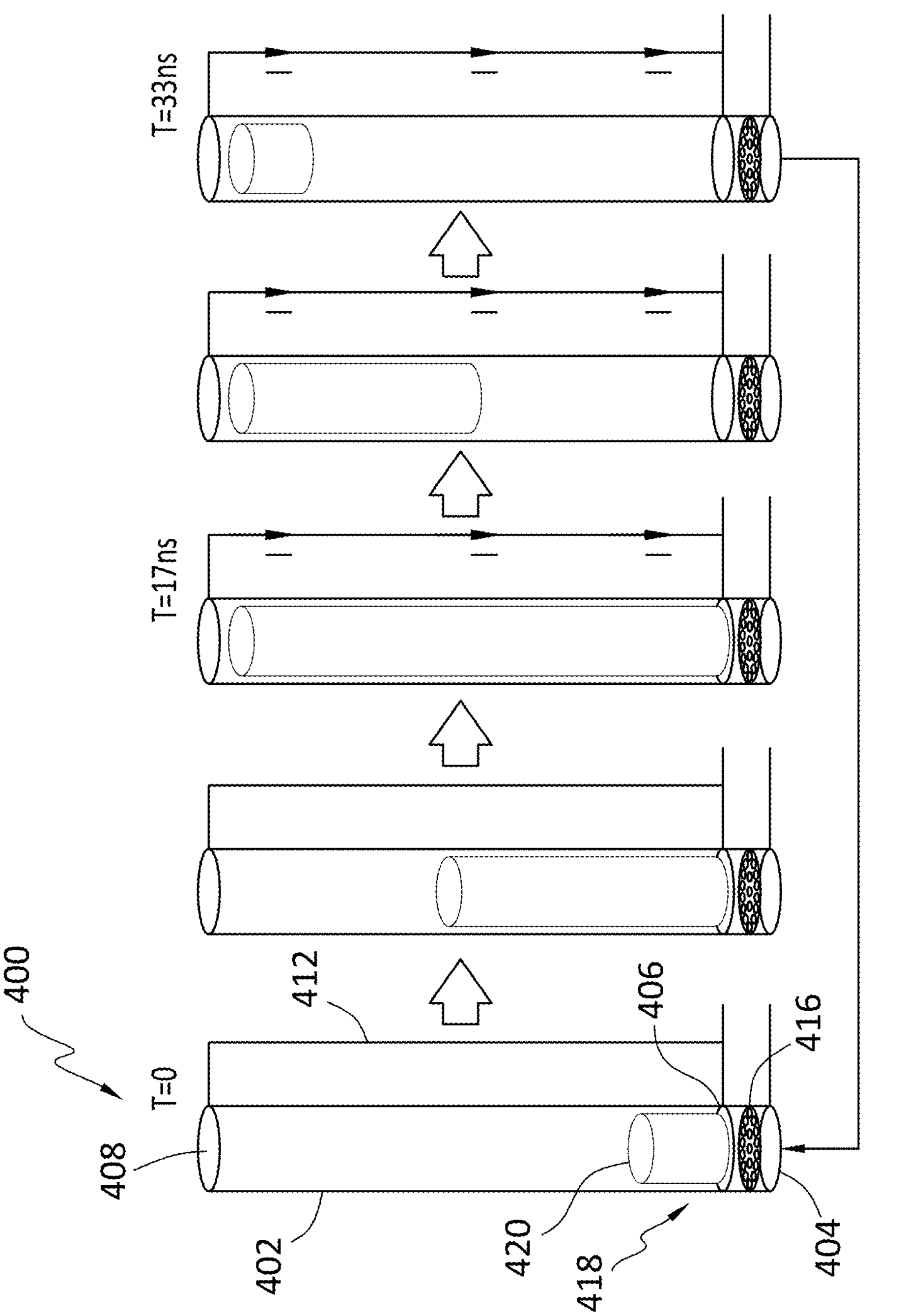
FIG. 4A is a schematic illustration of one cycle (or one period) operation sequence of the VLF transmitter of FIG. 4, with non-compensating beam current and return current together forming a linear electric dipole.
Figure 4:
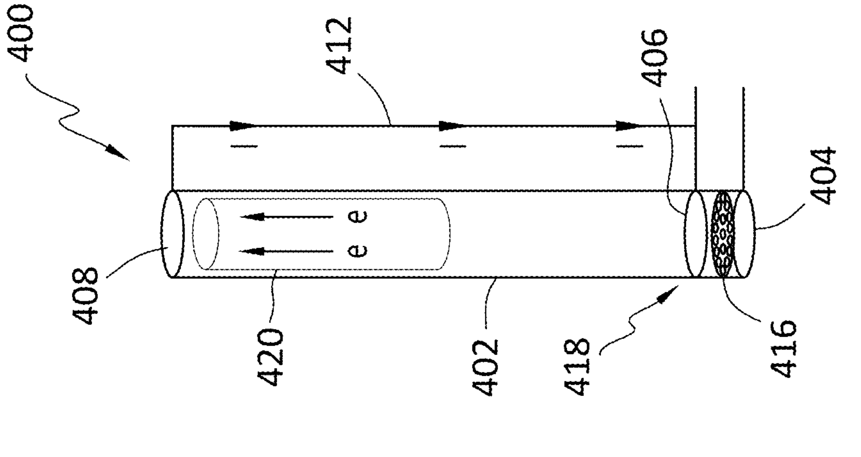
FIG. 4 is a schematic illustration of a VLF transmitter according to the invention, in which electron beam and return current flow form total dipole moment output.

FIG. 4 is a schematic illustration of a VLF beam antenna transmitter 400 according to the invention, in which electron beam and return current flow form total dipole moment output. VLF transmitter 400 includes vacuum tube 402 which is cylindrical (instead of annular as in FIG. 2), cathode 404, anode 406, an electron collector plate 408, electron current return wire 412, and control grid 416. FIG. 4A shows the time sequence of operation for one cycle of beam modulation to generate a non-canceling tube current moment and return wire current moment to generate the output waveform as shown in FIG. 3. At t=0, beam 420 is turned on and it travels with beam drift velocity determined by beam voltage in the electron gun system 418 that includes cathode 404 and anode 406. In the following example, HF generation is used for time sequences. For 30 MHz and a 1-meter tube, the effective drift speed of the beam should be $6\times10^7$ m/s, for example. At t=half cycle of the desired frequency, the front of beam 420 reaches collector 408. At this time, electron gun system 418 is turned off with the control grid bias voltage. The remaining beam continues to travel up, and collector 408 sends back a return current to electron gun system 418 at the speed of light. This is the second half cycle. After one complete cycle, electron gun system 418 is turned on again and the same cycle is repeated. The frequency can be changed after every single cycle. This will lead to a large-bandwidth capability of this Tx antenna, as explained herein. If the input control grid voltage waveform is a square wave, the net output dipole moment from both the beam current and return wire current will look like a bipolar sawtooth curve with the dipole moment of 10 Am in 1 m length antenna and a 10 A electron beam current as shown in FIG. 3. With a 10 Am dipole moment, the expected radiation power is 4 to 400 W in HF (3-30 MHz) for Hertzian dipole and input power can be calculated from the electron gun power input. This is a completely new way of driving an electrically small antenna (ESA) with direct electron beam current injection with variable modulation frequency and waveform, and the concept can be applied to multi-frequency bands (e.g., VLF, LF, MF, HF, VHF, and UHF).

The effective drift speed of the electron beam is a critical parameter to determine the output frequency, depending on the antenna length. For example, 30 MHz will have a 33 ns cycle period and 300 MHz will have a 3.3 ns cycle period with a shorter antenna length. The frequency can also be controlled with beam voltage, helical magnetic field, or angled injection of the beam into the vacuum tube with an axial magnetic field.

The frequency and waveform modulation can be changed after every cycle, to show the fractional bandwidth of 1, and an arbitrary output waveform shape control eliminates unwanted sidebands. This antenna can demonstrate many different kinds of modulation methods and arbitrary output waveforms through non-LTI processes. Bandwidth×efficiency ($\beta*\eta$) of the beam antenna is independent of ka for this beam antenna and is directly proportional to the beam current. This beam antenna can achieve 10 dB times of Chu $\beta*\eta$ limit in an HF-UHF band.

So far, the estimation of $\beta*\eta$ for the beam antenna assumed the fractional bandwidth of 1. The effective bandwidth calculation for the beam antenna according to three different modulation schemes demonstrates a fractional effective bandwidth of 1 or nearly 1. These three modulations are (1) minimum shift keying (MSK), (2) Frequency modulation (FM), and (3) Binary phase shift keying (BPSK). However, the invention is not restricted to these specific modulation schemes.

In addition to a large bandwidth with many modulation schemes, the output waveform can be manipulated using non-LTI relations between the input control grid voltage, beam current, and the dipole moment output. The nonlinearity comes from the nonlinear voltage-current characteristics of the electron gun. The convolution technique generates a sine wave output to eliminate unwanted sidebands of the output wave.

If an arbitrary voltage waveform other than the square wave pulse is applied, then the nonlinear response of the beam can generate an arbitrary waveform dipole moment with proper control of beam modulation frequency and beam current variation along the axial direction inside the tube. The magnitude of the electric dipole moment and the resultant magnetic field from the vacuum tube antenna and return wire antenna depend on the maximum electron emission current from the cathode. For the magnetic field output of 1 pT at 1 km free-space, a 10 A pulsed electron emission current is needed. At this level of beam current in the vacuum tube, electron current is severely limited by the space charge effects. Therefore, space charge neutralization techniques must be used to neutralize space charge. This can be achieved by filling the vacuum tube with an inert gas such as Xe or Ar, which will be ionized during electron beam operation to create neutralizing space charge ions.

For digital data transfer by frequency modulation, the anode beam voltage is changed (to change beam speed) and the frequency of the square wave pulse is also changed concurrently. Due to the low inertia of electrons, the electron beam current response and dipole moment change response can be as short as one period of VLF modulation frequency (i.e., twice the electron transit time inside a vacuum tube). This is the main reason why the bandwidth of this technology can be very high and fractional bandwidth can be as high as 100%. This implies that the data throughput even in a VLF 30 kHz carrier wave can be up to 10 s of kbps to make voice communication possible in the VLF band depending on the signal-to-noise ratio at the receiver end.

For a higher output signal and extended range in air, undersea, and underground, multiple antennas can be packaged in a compact form factor. This is the equivalent of increasing net current in dipole output. Also, if the length of the tube antenna is increased, the output signal and power are increased. Theoretically, the signal strength at a distance scales as current times the tube length and the radiated power scales as the square of both parameters.

C-VLF technology according to the invention is based on the fundamental concept of linear electric dipole field in the VLF spectrum, and electric current is actually carried by drifting electrons (or ions) in a vacuum tube. Beam modulation is the critical technology to modulate the electric dipole moment of the tube and the non-cancellation of the tube current moment and the return wire current moment. This is how this antenna can generate a much stronger output EM signal than a loop antenna of similar size and current. This transmitter, together with a current state-of-the-art 10 fT/√Hz-sensitivity magnetic gaussmeter, can form a VLF transceiver system to enable two-way voice/data communications underground at up to 500 m and undersea at up to 40 m. Multiple units, higher beam current, and the longer tube antenna can increase the communication distance in linear scale in field strength and square scale in radiated power.

In addition to VLF applications, the invention can be applied to ULF (300 Hz-3 kHz), LF (30 KHz-300 kHz), MF (300 kHz-3 MHz), HF (3 MHz-30 MHz), VHF (30 MHz-300 MHz), and UHF (300 MHz-3000 MHz) bands when compact form factor, large antenna current, and broadband capability play a significant advantage over the conventional wire antenna. In all these frequency bands, a 1 m long antenna can have controlled electron beam speed and modulation via beam voltage and beam modulation frequency. The invention has the capability to change the frequency in every cycle (period) by controlling electron beam modulation and beam speed to demonstrate a fractional bandwidth of 1 in all frequency bands. Moreover, a 10 dB×Chu limit in the VLF band was demonstrated using a modulated ion beam in a vacuum chamber, based on the direct current measurements in the antenna and near-field B-field measurements to deduce radiation power, input power, and bandwidth.

Figure 5:
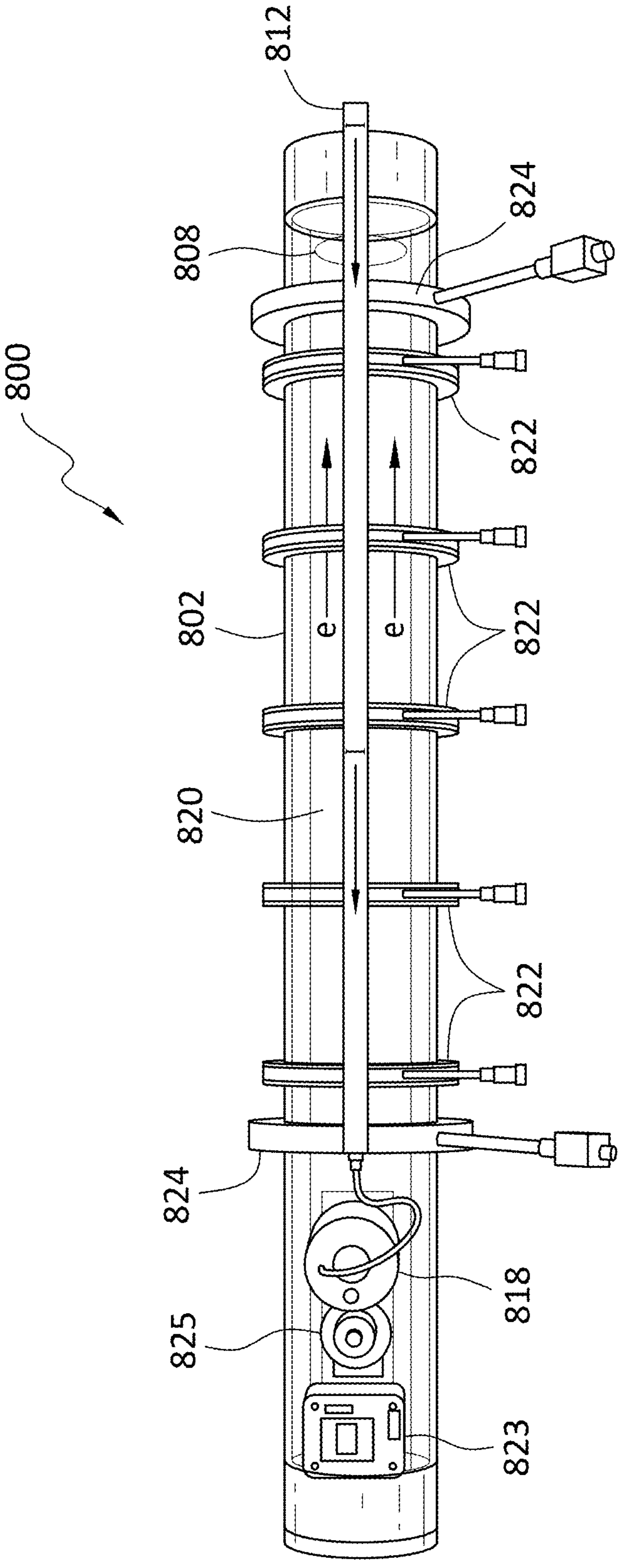
FIG. 5 is a drawing of a compact monopolar HF transmitter antenna according to the invention.

FIG. 5 is a drawing of a compact monopolar HF transmitter antenna 800. This benchtop 100-cm-long and 5.5-cm-diameter HF vacuum tube antenna (TX) includes a cylindrical vacuum tube 802. Five discrete external magnetic loop coils 822, each having a 500 Am DC-current input, generate azimuthal axial magnetic fields inside vacuum tube 802 for electron beam confinement. A high-current electron gun 818 directly injects current into vacuum tube 802 to generate an electron beam 820 in tube 802. The vacuum tube has a 1-meter length and 5 cm diameter for producing HF. These dimensions are chosen for illustration purposes, but the signal output strength is linearly scalable with the beam current in the vacuum tube. The level of vacuum maintained is 10-5 Torr or less to make electrons collisionless and lengthen the cathode lifetime. At one end of vacuum tube 802 is vacuum pump inlet 825 and digital vacuum gauge 823. Electron gun 818 includes an electron-emitting cathode, an anode to accelerate electrons, and a control grid between the cathode and the anode to turn on and off beam 820 as well as to control the amount of beam current. Thermionic cathode 804 will generate electrons with a yield of 1 A/cm$^2$ or more from the cathode emission surface. A collector plate 808 at the other end of vacuum tube 802 collects electrons and a return current wire 812 sends current back to electron gun system 818. Thus, a traveling electron I beam bunch 820 flows from electron gun system 818 inside vacuum tube 802 toward collector plate 808. Rogowski probes 824 are provided around the circumference of vacuum tube 802 for measuring current. Return current (i) flows back to electron gun system 818 through an exterior return wire harness 812 outside of Rogowski measurement probes 824. The apparatus includes a central DC-current driving wire, which is not shown in FIG. 5. The frequency is determined by (i) the beam speed controlled by the anode voltage, control grid modulation, and optional external magnetic field and/or (ii) a different way to inject electrons into the tube antenna to change the effective drift speed of electrons. This antenna will generate a Hertzian electric dipole field radiation and can change frequency after every cycle (period) of the wave. The fractional bandwidth can be close to 1, and this non-LTI antenna will violate Chu's ESA bandwidth limit.

Figure 6:
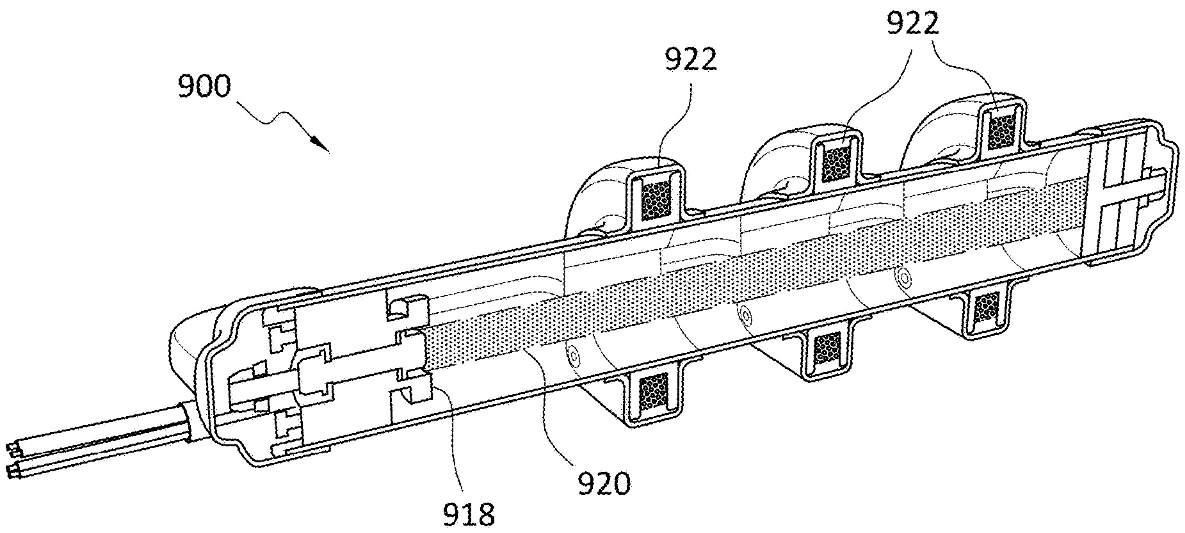
FIG. 6 is a cross-sectional drawing of a ruggedized VHF vacuum tube antenna according to the invention.
Figure 7:
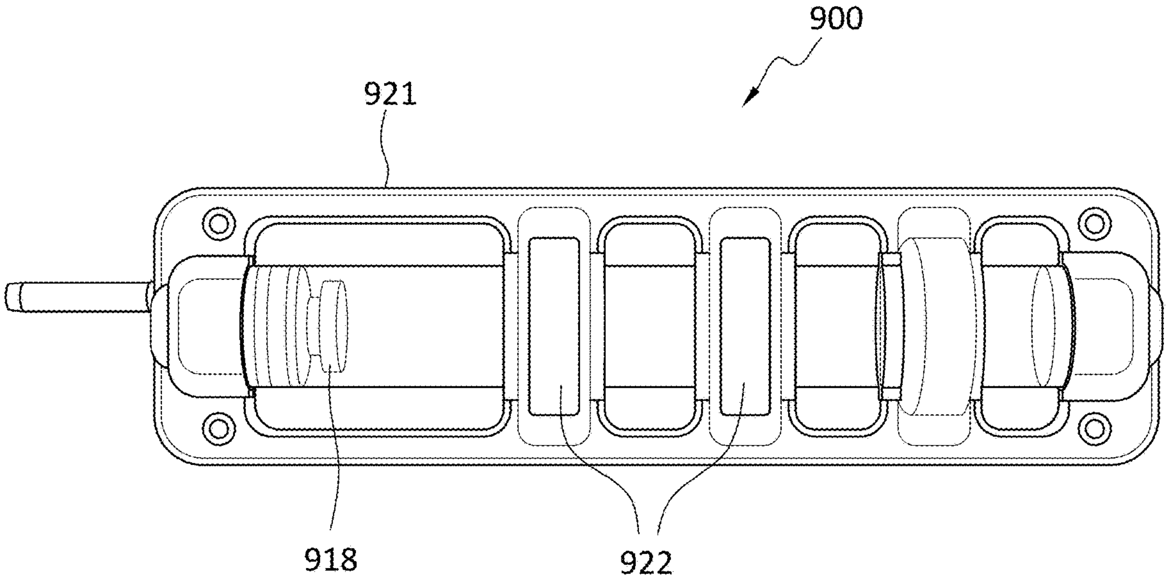
FIG. 7 is a perspective drawing of the VHF vacuum tube antenna of FIG. 9.

FIGS. 6 and 7 illustrate a portable and ruggedized 30-cm-long and 5.5-cm-diameter VHF vacuum tube antenna (TX) 900 with electron gun 918, electron beam 920, and three external field loops 922 (as seen in the cross-sectional image of FIG. 6). As is illustrated in FIG. 7, antenna 900 includes a carbon fiber composite surround 921, which has a clam-shell configuration in this particular embodiment.

Generating an HF-to-UHF dipole moment will depend on the electron gun beam voltage that determines the beam speed (and so the speed of the current segment) and the modulation frequency of the control grid voltage. The output waveform can be arbitrarily shaped by the control grid voltage modulation waveform to suppress higher harmonics and sidebands. The beam current and the return wire current form a total dipole current, and the beam is modulated in such a way that these two currents do not annihilate, thus making this antenna a true Hertzian electric dipole antenna.

Figure 8:
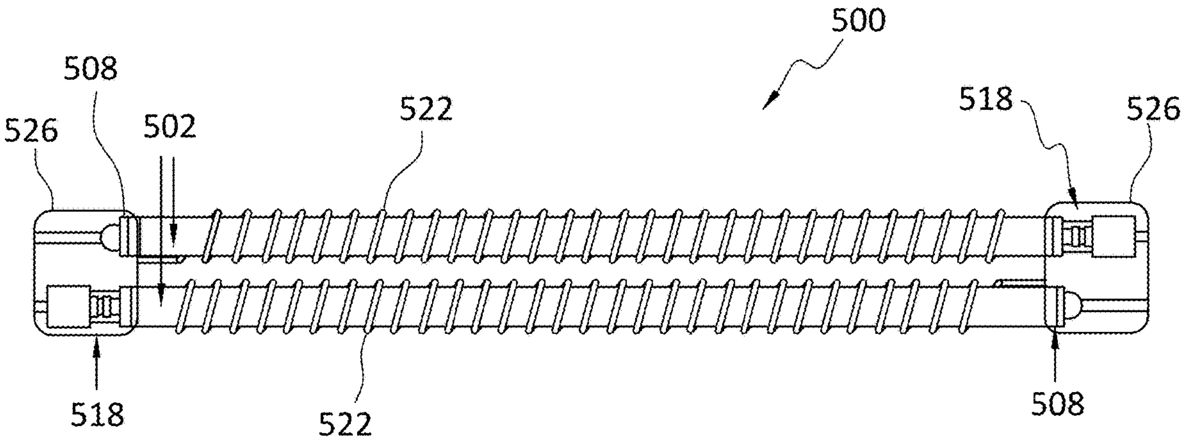
FIG. 8 is a side view of a bipolar transmitter according to the invention, useful for cases in which beam speed is difficult to slow down to match with very low frequency.
Figure 8A:
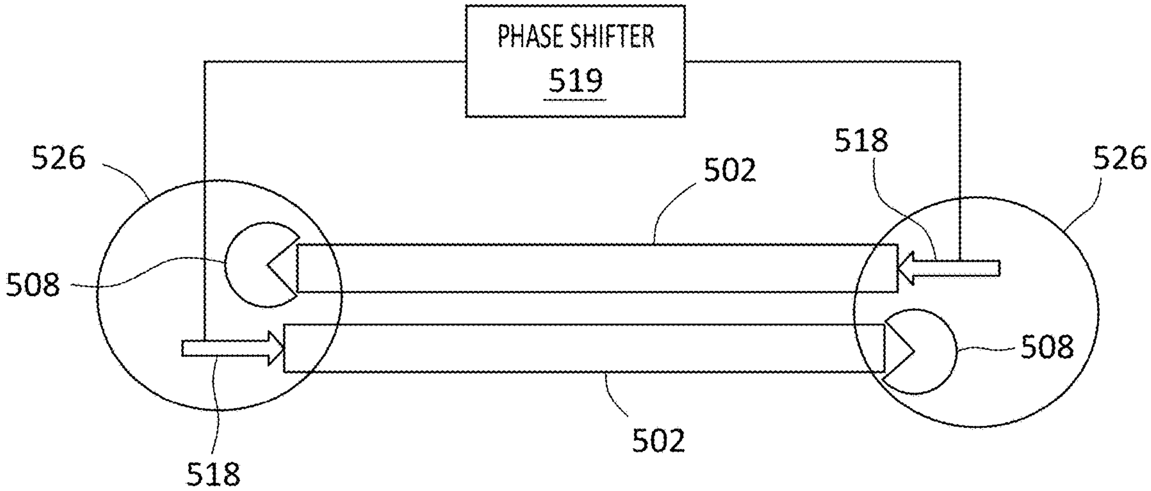
FIG. 8A is a schematic illustration of the bipolar transmitter of FIG. 5.

When the frequency is too low, it may be difficult to slow down the electron beam speed to match the wave frequency. In that case, the monopolar tube antenna of FIG. 2 can be replaced with a bipolar tube antenna 500 as shown in FIG. 8. A bipolar electron beam antenna has two vacuum tubes 502 operating alternatively during alternating half-cycles of the carrier wave, each tube having a helical coil 522. The system has two electron guns 518 and two beam collectors 508. A dielectric enclosure 526 encloses one electron gun 518 and one beam collector 508 at each end of bipolar tube antenna 500. Each tube 502 operates alternatively so that the beam current in either tube does not annihilate the other beam current as in a monopolar tube antenna. Non-cancellation of two currents is one of the critical parts of the invention of both monopolar and bipolar tube antennas. Alternating beam injection in bipolar design can be controlled by a phase splitter circuit 519. FIG. 8A is a schematic illustration of the bipolar transmitter of FIG. 8.

The monopolar antenna (FIG. 2) has the maximum current capability limited by the electron (or ion) gun technology. If the electron gun can emit a maximum current of 10 A from the cathode, then this would be the maximum current in the monopolar antenna. The bipolar antenna (FIG. 8) does not have the maximum current limit by beam gun, but it has electrostatic charge build-up on each end. which will limit the maximum dipole moment depending on the surrounding media. For example, if the antenna is operating in air, there is an electrical breakdown limit of 30 kV/cm.

Figure 9:
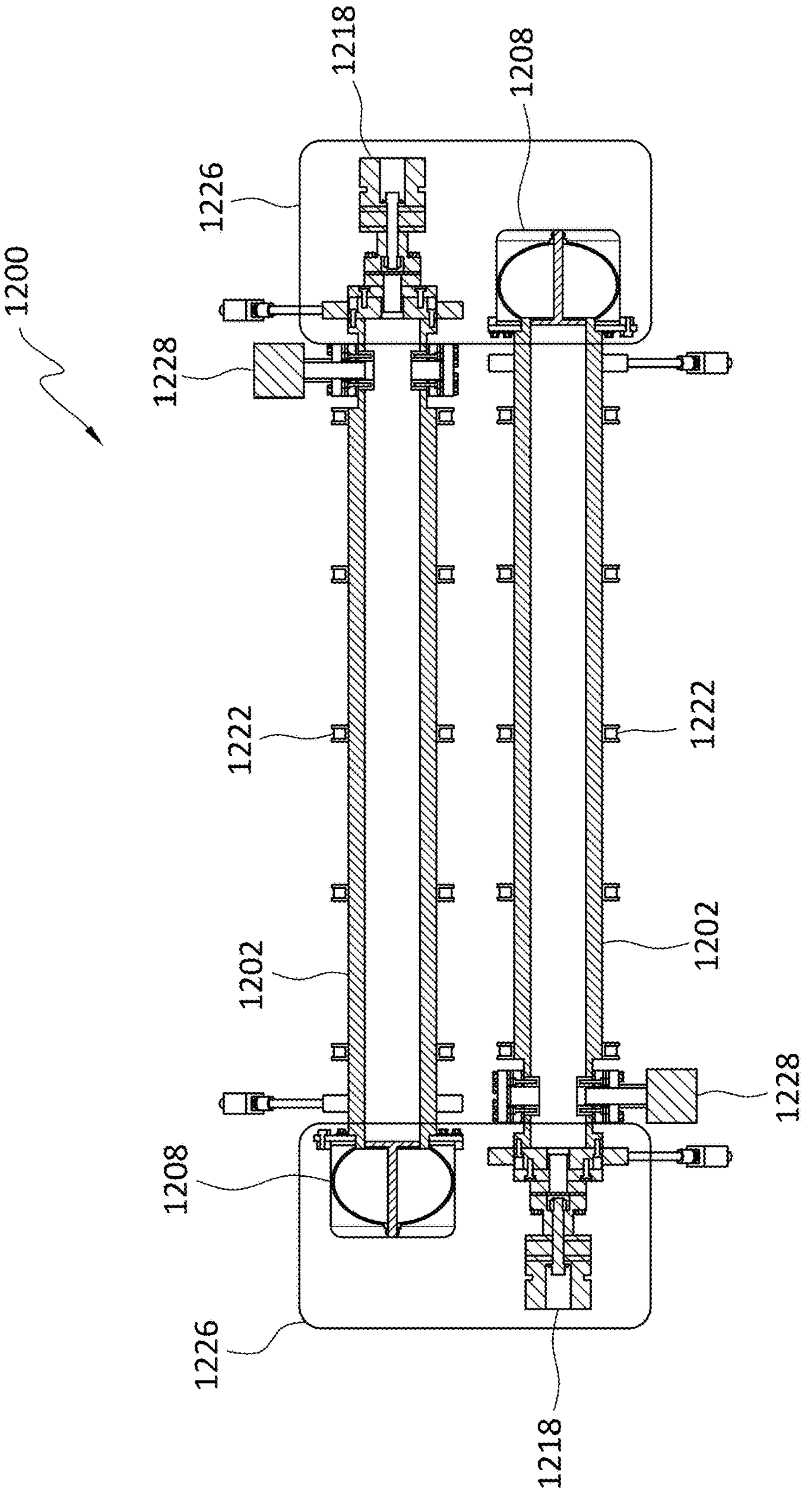
FIG. 9 is a cross-sectional drawing of a bipolar transmitter according to the invention.

FIG. 9 illustrates another variant of a bipolar antenna 1200, having external magnetic loop coils 1222 to generate axial magnetic fields for electron beam confinement, instead of helical coils. There are two vacuum tubes 1202, two pressure gauges 1228, and two dielectric enclosures 1226 each enclosing an electronic beam source 1218 and an electron collector 1208.

Figure 10:
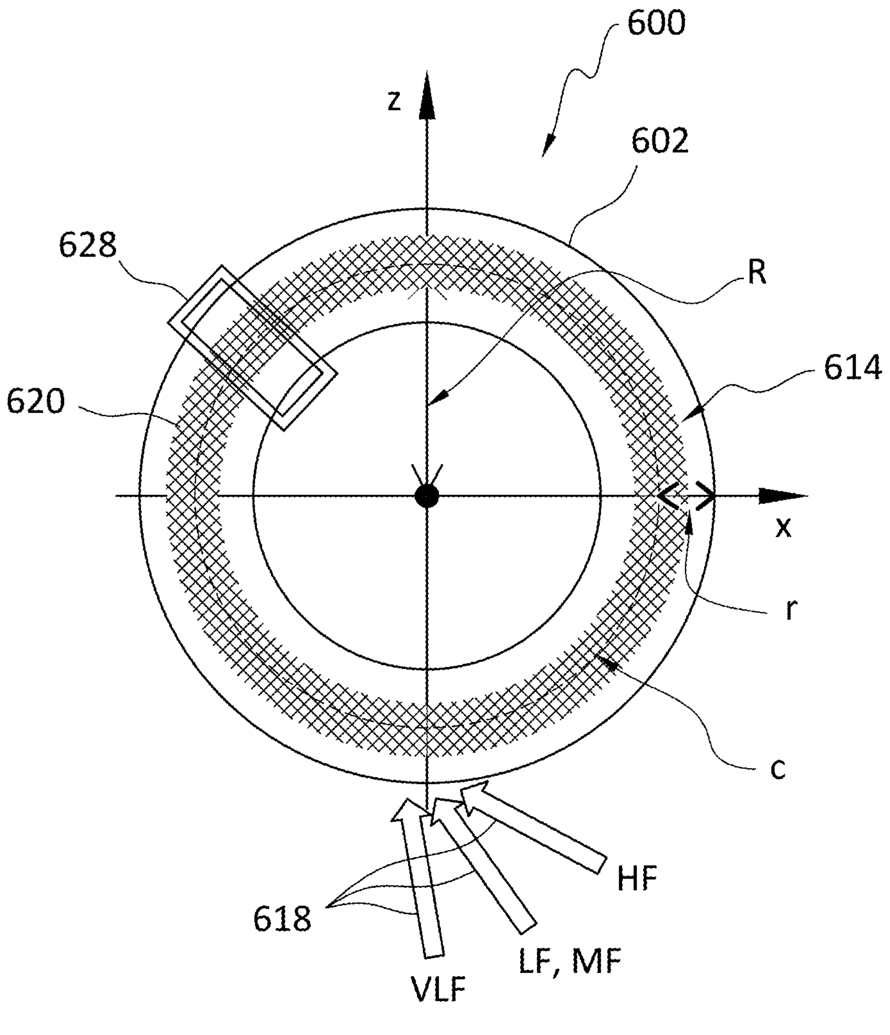
FIG. 10 is a schematic illustration of a toroidal transmitter according to the invention that does not require a beam collector, and in which beam current can be accumulated from the beam gun, so the output power can be significantly higher than a monopolar and bipolar design.

The third embodiment of the invention overcomes both of these limits (maximum current capability of the monopolar antenna embodiment and maximum dipole moment of the bipolar antenna embodiment), as it can be scaled up to work with a very high current and output power, far-field radiating beam antenna. This antenna 600 has the toroidal vacuum tube 602 as shown in FIG. 10, having a major radius R to center line C and a minor radius r from center line C. A helical coil (not shown in FIG. 10) surrounds the tube to generate DC toroidal magnetic field to confine a spinning beam 620. The basic idea is that a pulsed beam is injected by VLF, LF or MF, or HF e-guns 618 synchronously with a spinning beam bunch in the torus. Toroidal vacuum tube 602 is filled with background plasma 614 to neutralize the space charge of beam bunch 620. Spinning beam bunch speed can be determined by the gun beam voltage and the injection angle. The frequency of the output is determined by the frequency of the spinning bunch. When the beam bunch arc length is about the half circle, the output electric dipole field is the highest. Although this toroidal beam bunch antenna looks like a magnetic loop dipole, this antenna is indeed an electric dipole antenna whose field strength goes like $1/r^2$ in near-field and radiates like a linear electric dipole in the far field. The radiation pattern and polarization, however, look like a magnetic loop dipole. The major advantage of the toroidal beam antenna is that the beam current can be scaled up well above the beam gun current, because the beam current can accumulate when the beam is injected from the gun synchronously with a spinning beam bunch. The frequency modulation of the toroidal beam bunch can be achieved with both a beam modulator 628 that applies an electric field inside the torus to accelerate or decelerate beam speed and beam voltage change in the pulsed beam gun. The maximum current in a torus antenna is determined by beam Coulomb collisions with background plasma and neutral particles. Beam plasma instability will play a role to slow down beam speed by kinetic phase space beam instability. Both of these will spread out the beam arc to fill the whole torus to make the toroidal dipole antenna 600 just a DC magnetic loop antenna. Based on detailed calculations, up to a 100 A current is feasible in the VLF band and 1 kA in the HF band. As the output radiation power scales with the square of the antenna current, there is a huge improvement in output radiation power from either a monopolar or bipolar antenna. This compact toroidal electric dipole radiating antenna can form a phased array for long-range transmission.

Figure 11:
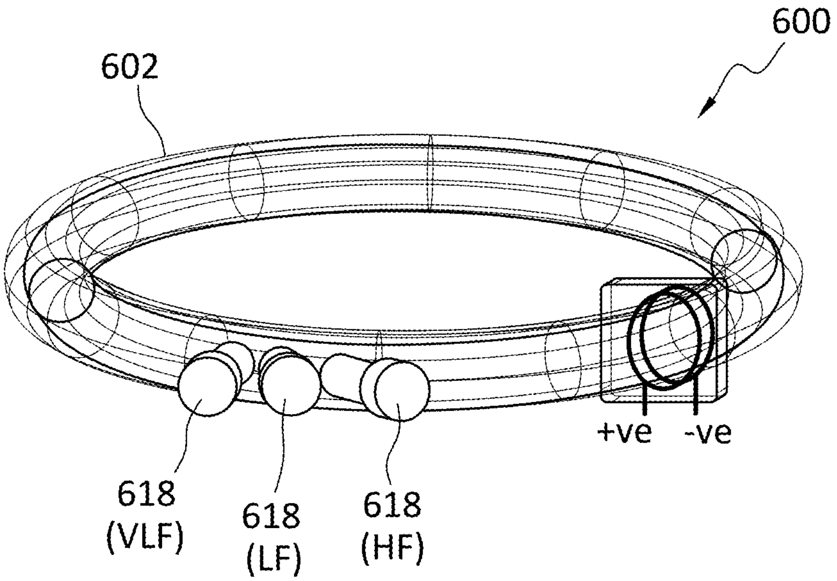
FIG. 11 is a perspective view of the toroidal transmitter of FIG. 6 in 3D view.
Figure 11A:
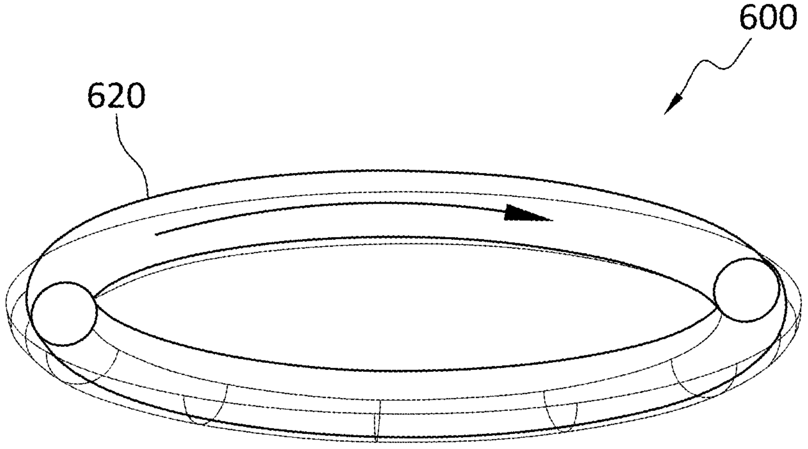
FIG. 11A is a perspective view of the toroidal transmitter of FIG. 6, with the e-guns and portions of the vacuum tube removed for ease of viewing a beam bunch within the toroidal transmitter.

FIG. 11 shows a perspective view of the toroidal transmitter of FIG. 10 in 3D view. FIG. 11A is a perspective view of the toroidal transmitter of FIG. 10, with the e-guns and portions of the vacuum tube removed for case of viewing a beam bunch within the toroidal transmitter.

Figure 12:
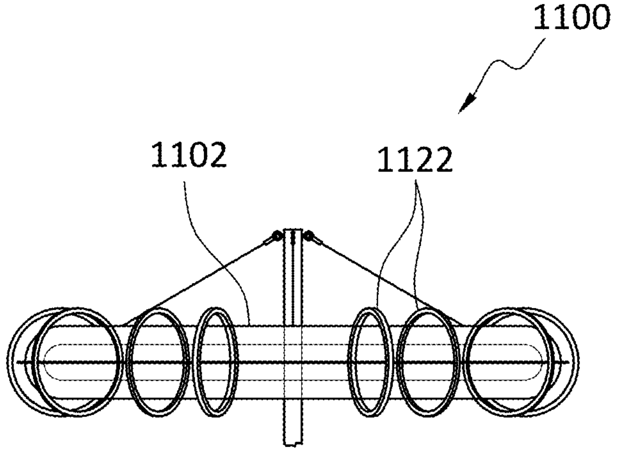
FIG. 12 is a drawing of a mast configuration of a 2-meter toroidal version of a charged particle beam antenna according to the invention.
Figure 12A:
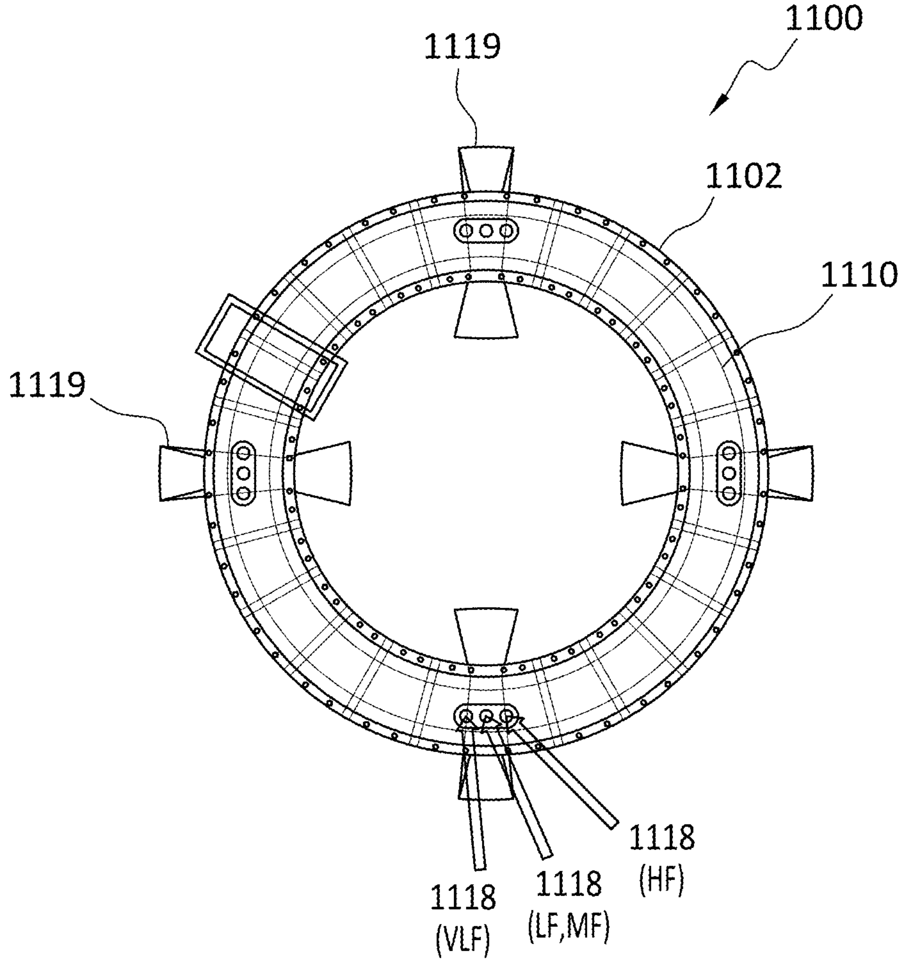
FIG. 12A is a drawing of a horizontal surface configuration of a 2-meter toroidal version of a charged particle beam antenna according to the invention.

FIG. 12 is a drawing of a mast configuration and FIG. 12A is a drawing of a horizontal surface configuration of a 2-meter torus version of a charged particle beam antenna 1100 according to the invention, which rests on cradles 1119. The major radius R is 0.3 to 5 meters. The minor radius r is 1 to 30 centimeters. VLF, LF or MF, or HF electronic gun 1118 injects a pulsed beam, and the beam injection angle and beam voltage determine the frequency. The electron beam inside the torus is bunched, with the pulsed beam injection and the beam rotation being synchronized. Toroidal field coils 1122 are placed around torus 1102, and/or a center-line current coil 1110 makes the magnetic field inside helical and provides a poloidal B-field. The electron beam is well-confined by the helical magnetic field. A space charge neutralized plasma is used at a pressure of $10^{-4}$ to $10^{-5}$ Torr.

Figure 13:
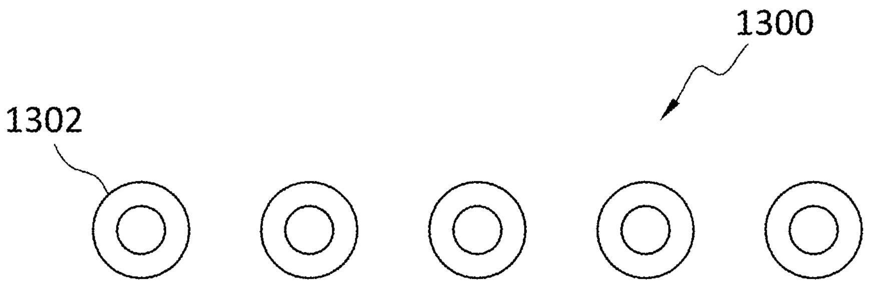
FIG. 13 is a schematic drawing of a phased array antenna formation of compact toroidal beam antennas to generate very long-range directional RF in VLF to UHF band for far-field radiation applications.

All three antenna embodiments; monopolar, bipolar, and toroidal, can be configured in an array with multi-elements. Theoretically, the gain goes like $N^2$ number of elements. From the super-gain, end-fire theory, the element spacing can be zero; however, there is a technical limitation of synchronization between elements. The current amplitude and phase of each antenna element must be perfectly synchronized. From a practical setup, a demonstrable system (as illustrated in FIG. 13) would be a 1-meter high or 1-meter diameter torus 1302, 3-to-5-meter total horizontal spacing five element linear array 1300. This will allow for HF propagation up to the Ionosphere (i.e., 100 s of km range) to have a global HF communication from a multi-element linear array of beam antennas in very short subwavelength spacing. Specifically, as an end-fire array, directionality is along the element array and is steerable. As for the takeoff angle for reflecting off the Ionosphere, the main lobe is along the length of the array. It can be a ground wave, and can be gimbaled to aim at the Ionosphere. This is only going to be in a one-beam direction, however, multiple arrays are added around, for example, a circular shape, one can activate various arrays and perform beam steering.

Figure 14:
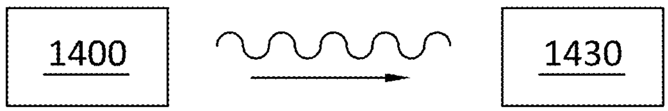
FIG. 14 is a schematic drawing of a compact transmitter according to the invention coupled with a receiver or sensor.

As is illustrated schematically in FIG. 14 a compact transmitter 1400 according to the invention coupled with a receiver or sensor 1430, which may be a very sensitive RF, especially VLF to UHF, receiver to form a two-way communication system for undersea, underground, and free-space communications, or a very sensitive RF, especially VLF, underground or undersea VLF GPS receiver for RF-denied assured/alternate position, navigation, and timing applications, or a very sensitive RF, especially VLF, underground or undersea EM sensor for imaging and characterization of subsurface or underwater conductive media.

Figure 15:
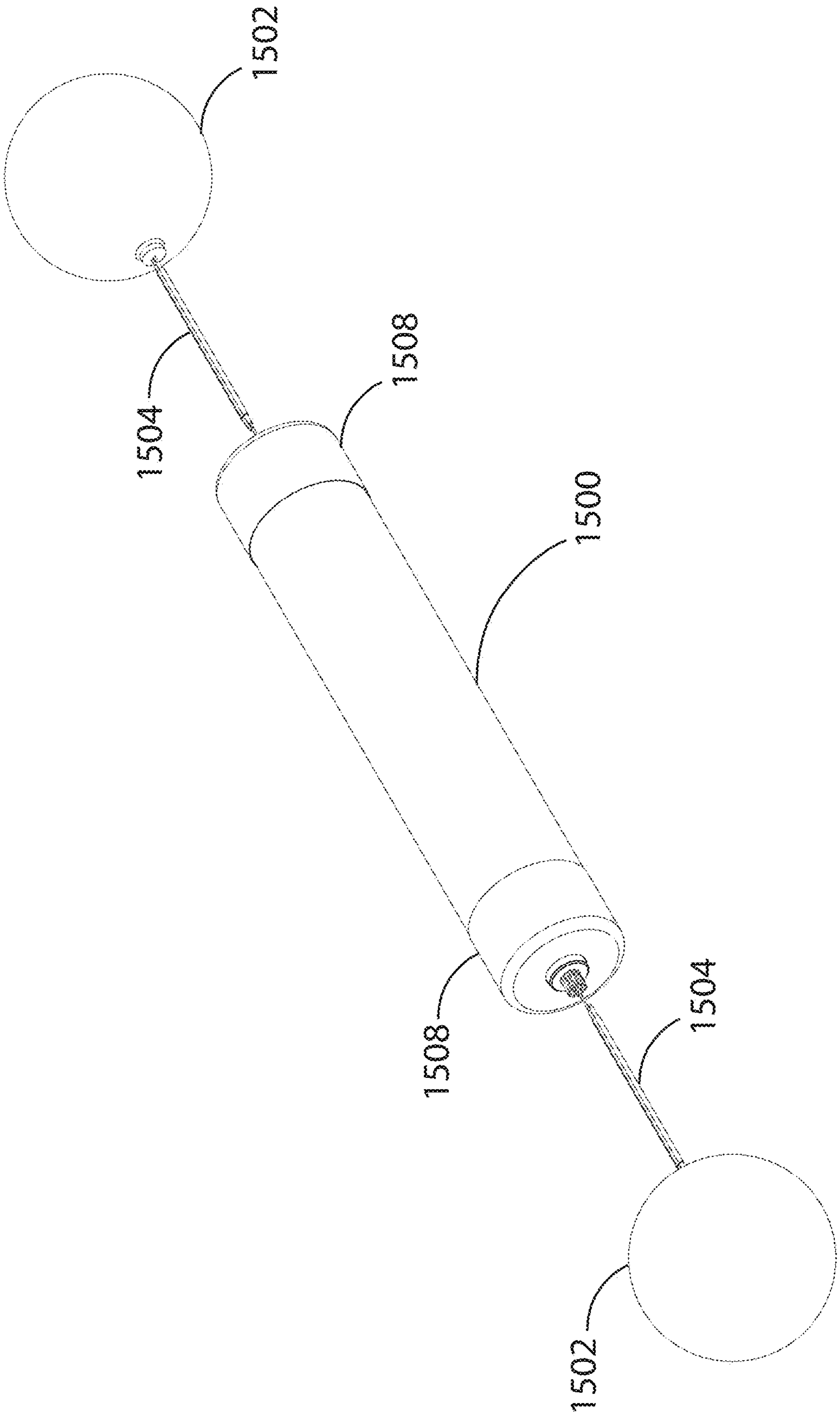
FIG. 15 is a drawing of an enhanced bipolar transmitter of the type illustrated in FIGS. 8 and 8A or FIG. 9, in which the two beam collectors are connected to respective spherical balls by conducting wires.

A further embodiment of the invention is illustrated in FIG. 15, in which a bipolar particle beam antenna 1500 of the type illustrated in FIGS. 8 and 8A or in FIG. 9 is enhanced by the two beam collectors of the particle beam antennae 1500 being respectively connected to twin electrostatic spherical shell balls 1502 by insulated conducting wires 1504 of a certain length. The output of the antenna due to beam current convection is enhanced by virtue of an electromagnetic (EM) wave that is radiated from the conduction current in the wire during the charge transfer from the plate to the spherical ball 1502.

As electrons are collected during a half cycle of operation of the antenna, they will charge up the collector for one of the tubes, as well as the gun cathode of the other tube, and also a shielding cup 1508 covering the collector and gun at each respective end of antenna 1500. The purpose of shielding cup 1508 is to distribute electric charges outside of the cup and make the internal electric field go to zero, so that an electron beam is not reflected from the collector during charge accumulation.

Both electrostatic conducting spherical balls 1502, as well as shielding cups 1508, are coated with a high-breakdown-voltage dielectric (as is illustrated below in connection with FIG. 16) to avoid corona discharge and electrical breakdown.

Because wire 1504 is connected from a respective cup 1508 to a hollow electric spherical ball 1506, electric charges will move from cup 1508 to sphere 1506, and this conduction current in wire 1506 will generate RF output. If this current is comparable to the beam current within particle beam antenna 1500, the total dipole field output is enhanced by the additional current in a wire 1504.

Figure 16:
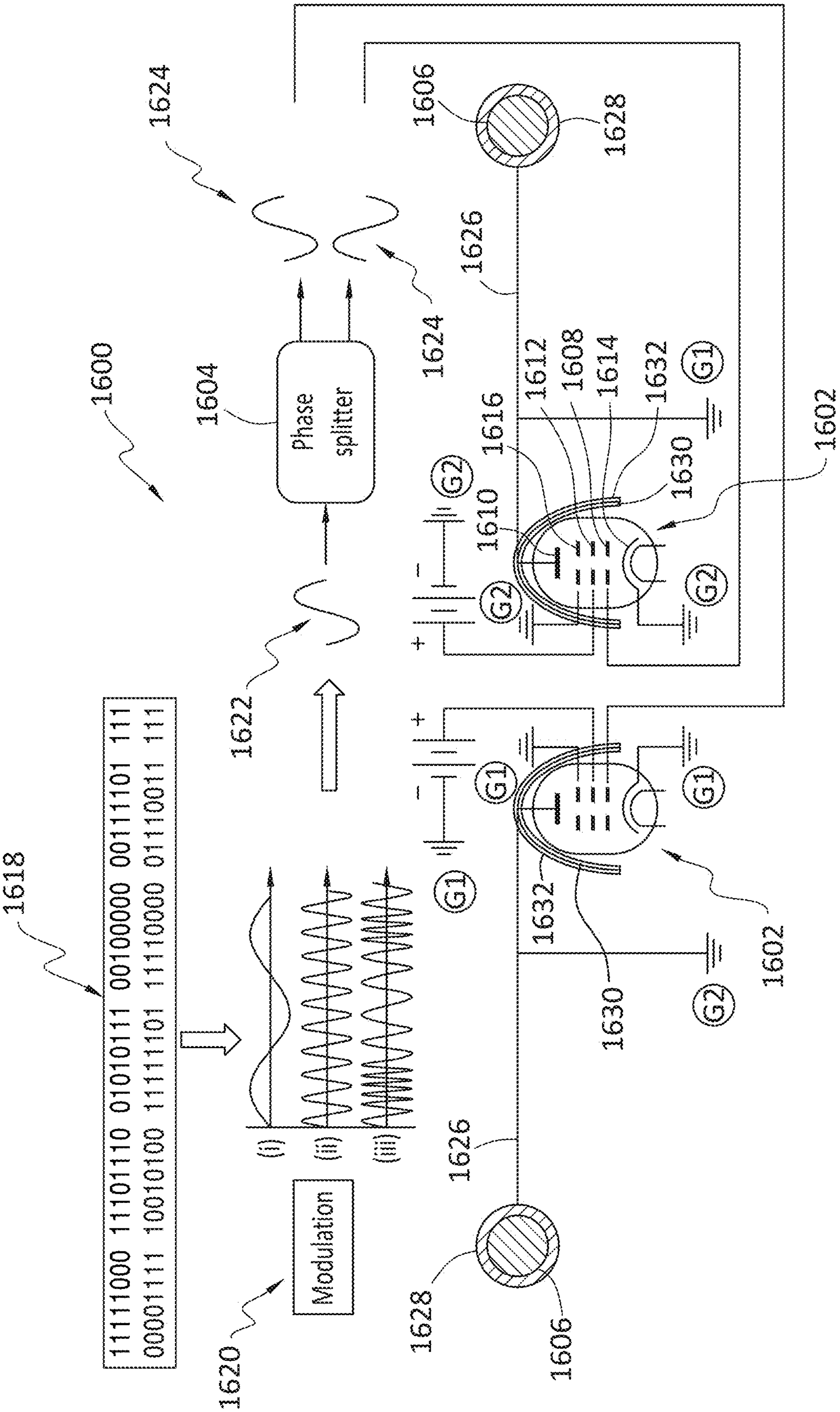
FIG. 16 is a schematic illustration of a compact transmitter according to another aspect of the invention, which includes, instead of particle beam tubes, twin multigrid vacuum tubes, a phase splitter, and twin spherical balls, in which the two plate electron collectors of the multigrid vacuum tubes are connected to respective spherical balls by conducting wires.

With reference to FIG. 16, another aspect of the invention provides a compact transmitting antenna 1600 that includes, instead of particle beam tubes as described above, twin multigrid vacuum tubes 1602, a phase splitter 1604, and twin electrostatic spherical shell balls 1606. A digital data input 1618 is used by modulator 1620, which may use FSK modulation, for example, to produce a modulated input signal 1622. Phase splitter 1604 splits input signal 1622 into two out-of-phase signals 1624.

In this twin vacuum tube antenna embodiment, the compact transmitting antenna 1600 includes twin multigrid vacuum tubes 1602. Each vacuum tube 1602 has a grounded cathode 1614 (a floating ground), a control grid 1608 that receives a respective one of out-of-phase signals 1624, a screen grid 1612 that is connected to high voltage and serves as an anode in this embodiment to accelerate electrons from cathode 1614, a suppressor grid 1616 that is grounded (a floating ground), and a plate electron collector 1610. Suppressor grid 1616 is grounded to reduce secondary electrons from plate 1610 Pass-through electrons will charge up the plate electron collector 1610 that is not connected to a high voltage power supply. This is different from the conventional way of using multigrid vacuum tubes such as pentode or tetrode. The accumulated charge in plate 1610 is redistributed to a respective electrostatic conduction spherical shell 1606. Spherical shell 1606 is connected to plate 1610 by insulated conducting wire 1626 of a certain length. An electromagnetic (EM) wave is radiated from the current in the wire during the charge transfer from the collector to the spherical ball 1606. The frequency of this EM wave is solely controlled by an input arbitrary voltage waveform and is of any frequency, limited by electrostatic charge in spherical ball 1606 and the grid frequency bandwidth limit. Its frequency is not limited by the conventional antenna theory where the Chu limit limits the bandwidth of the modulated waveform frequency output. Phase splitter circuit 1604 can be configured to alternate the control grid bias voltage so that each vacuum tube 1602 generates output only during the half cycle of operation alternatively.

The screen grid positive voltage accelerates electrons from cathode 1614, and some electrons are collected by screen grid 1612 and the remaining electrons pass through and are collected at plate 1610. These electrons will charge up the plate and the electrostatic ball 1606 that is connected by conducting wire 1626.

Both electrostatic conducting spherical balls 1606 are coated with a high-breakdown-voltage dielectric 1628 to avoid corona discharge and electrical breakdown.

Electric charges on the balls 1606 and the current in the two wires 1626 oscillate according to the input modulated signal 1622.

Figure 17:
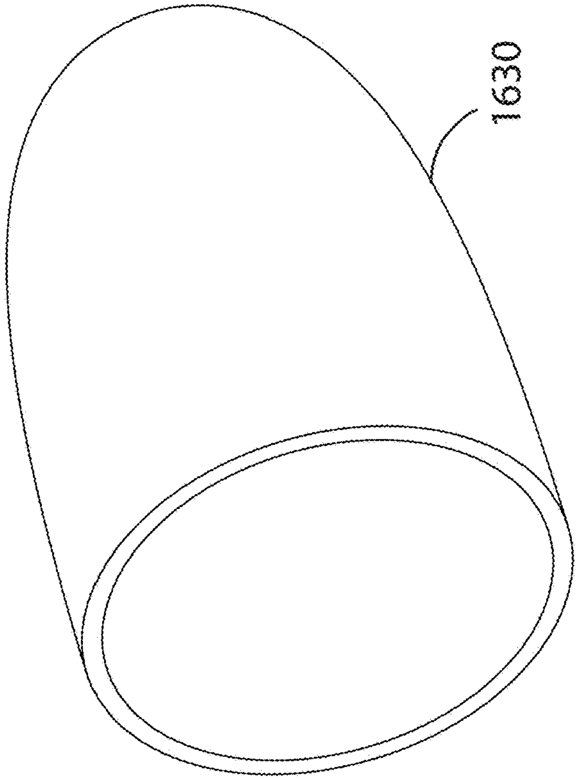
FIGS. 17, 17A, and 17B are perspective, side, and cutaway side views respectively of a shielding cap for use in the transmitter of FIG. 16.
Figure 17B:
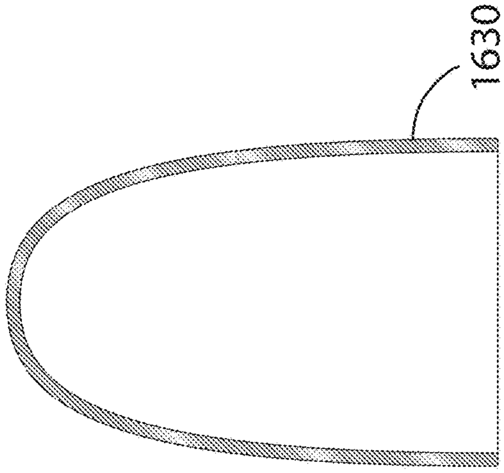
Figure 17A:
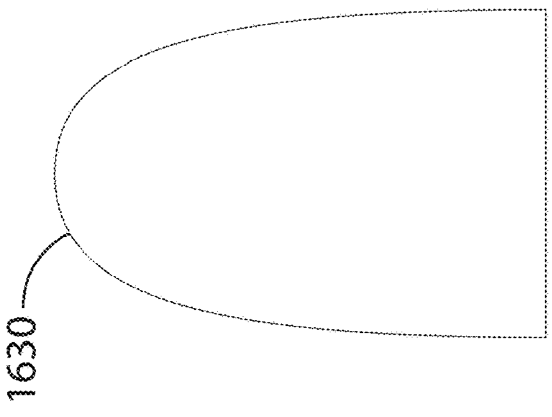

Two additional electric shielding caps 1630 enclose each vacuum tube 1602 to reduce the electric field inside the tube from accumulated charges on plate 1610 (FIGS. 17, 17A, and 17B illustrate perspective, side, and cutaway side views respectively of a shielding cap 1630). These two caps 1630 are coated with high-breakdown-voltage dielectric material 1632 to avoid electrical breakdown between them. These two caps 1630 are shown schematically in FIG. 16 as half-circles and are electrically connected to plate 1610 and wire 1626 only.

There are two virtual grounds G1 and G2 that connect each to a respective cathode 1614 and suppressor grid 1616 of one vacuum tube, and plate 1610 of the other vacuum tube. This arrangement is necessary to accumulate electrostatic charges during the half-cycle of wave input to ensure that the current flows from plate 1610 to ball 1606, not to the ground or other closed circuits. So, this embodiment as illustrated in FIG. 16 does not have an actual conventional earth ground. All floating grounds G1 illustrated in FIG. 16 are separately connected with each other, as are all floating grounds G2, but floating grounds G1 and G2 do not have a common ground and they are not connected to conventional earth ground.

The only constraint in input waveform 1622 is that the time integral of the waveform must be zero on average; otherwise, there will be a continuous electrostatic charge accumulation on one of the balls 1606. These asymmetric charge accumulations may generate either corona discharge or an electrical arc that may release excess charges, so the antenna 1600 can still operate with some noise caused by arcing.

In all frequency bands, from ULF (300 Hz-3 kHz) to UHF (300 MHZ-3000 MHz), a 1 m long antenna of the type illustrated in FIG. 16 can have controlled modulation via control grid voltage modulation. The invention has the capability to change the frequency in every cycle (period) by controlling control grid waveform input and electrostatic charge-induced current output to demonstrate a fractional bandwidth of 1 in all frequency bands.

In this twin tube embodiment, the compact transmitting antenna 1600 can be combined with a receiver or sensor (see receiver or sensor 1430 in FIG. 14), which can be a very sensitive receiver to form a two-way communication system for undersea, underground, or free-space communications; or a very sensitive underground or undersea very low-frequency GPS receiver for RF-denied assured/alternate position, navigation, and timing applications; or a very sensitive underground or undersea EM sensor for imaging and characterization of subsurface or underwater conductive media. All of these applications are possible with ultra-wide bandwidth, so very high data rate communication is now possible.

A linear small electric dipole antenna of the type illustrated in FIG. 16 can generate a far-reaching magnetic signal because of the $1/r^2$ attenuation of the near-field in free-space.

The current in antenna 1600 is directly driven by an electron beam injection from the cathode 1614 to plate 1610 so that the current in antenna 1600 can be orders of magnitude higher than a conventional conductive wire antenna with a current-driving circuit.

Compact multigrid vacuum tube transmitter 1600, like the charged particle beam plasma transmitters described herein, does not require an antenna feed with impedance matching, and violates the Chu limit and can demonstrate a 10 dB enhancement of the Chu bandwidth limit in all frequency bands, from VLF, LF, MF, HF, VHF, to UHF.

What is claimed is:

1. A transmitting antenna comprising:

a first and a second vacuum tube, each respective vacuum tube comprising at least:
- a grounded cathode;
- a control grid that receives a respective signal; and
- a plate electron collector;

a first spherical ball connected by a first conducting wire to the plate electron collector of the first vacuum tube;

a second spherical ball connected by a second conducting wire to the plate electron collector of the second vacuum tube;

wherein output of the transmitting antenna is produced by an electromagnetic wave that is radiated from conduction current in each of the first and second conducting wires.

2. A transmitting antenna in accordance with claim 1, wherein each of the first and second vacuum tubes further comprises a screen grid that is connected to high voltage.

3. A transmitting antenna in accordance with claim 2, wherein a positive voltage at the screen grid of each of the first and second vacuum tubes accelerates electrons from the cathode, some of which are collected by the screen grid, and a remainder of which are collected at the plate electron collector and which charge up the plate electron collector and the respective spherical ball.

4. A transmitting antenna in accordance with claim 1, wherein each of the first and second vacuum tubes further comprises a suppressor grid that is grounded.

5. A transmitting antenna in accordance with claim 4, wherein the grounded suppressor grid of each of the first and second vacuum tubes reduces secondary electrons from the plate electron collector.

6. A transmitting antenna in accordance with claim 4, wherein:

the cathode and the suppressor grid of the first vacuum tube are grounded by a first floating ground that is connected to the plate electron collector of the second vacuum tube; and the cathode and the suppressor grid of the second vacuum tube are grounded by a second floating ground that is connected to the plate electron collector of the first vacuum tube.

7. A transmitting antenna according to claim 6, wherein the first and second floating grounds do not have a common ground and are not connected to a conventional earth ground.

8. A transmitting antenna according to claim 1, further comprising a modulator configured to produce a modulated input signal from a data input.

9. A transmitting antenna according to claim 8, wherein the modulator uses FSK modulation to produce the modulated input signal.

10. A transmitting antenna according to claim 1, further comprising a phase splitter configured to split an input signal into first and second out-of-phase signals that are received respectively by the control grid of the first vacuum tube and the control gird of the second vacuum tube.

11. A transmitting antenna according to claim 10, wherein the phase splitter is configured to alternate a bias voltage at the control grid of the first vacuum tube and the control grid of the second vacuum tube so that each of the first and second vacuum tubes generates output only during a half cycle of operation of the transmitting antenna.

12. A transmitting antenna according to claim 10, wherein the input signal has a time integral of substantially zero.

13. A transmitting antenna in accordance with claim 10, wherein electric charges on the first and second spherical balls and the current in the first and second wires oscillate according to the input signal.

14. A transmitting antenna in accordance with claim 1, wherein the first and second spherical balls are coated with a high-breakdown-voltage dielectric.

15. A transmitting antennae in accordance with claim 1, further comprising:

a first electric shielding cap enclosing the first vacuum tube; and a second electric shielding cap enclosing the second vacuum tube.

16. A transmitting antenna in accordance with claim 15, wherein each of the first and second electric shielding caps is coated with a high-breakdown-voltage dielectric.

17. A transmitting antenna comprising:

a first and a second vacuum tube, each respective vacuum tube comprising:

a charged particle beam gun positioned for producing a beam of finite length of electrons or ions within the vacuum tube that moves within the vacuum tube at a controlled speed to generate an electromagnetic wave; and a collector at an end of the vacuum tube opposite to the charged particle beam gun for collecting modulated charged particles;

a beam timing controller arranged to control at least an on time and an off time of the beam; and a beam speed controller arranged to control speed of the beam within the vacuum tube;

the second vacuum tube being parallel to the first vacuum tube but oriented for the charged particle beam to travel in a direction opposite to travel of the charged particle beam in the first vacuum tube;

a first spherical ball connected by a first conducting wire to the collector of the first vacuum tube;

a second spherical ball connected by a second conducting wire to the collector of the second vacuum tube;

wherein a frequency modulator is provided by the transmitting antenna, arranged to modulate the beam for carrying voice or data signals to transmit information from the transmitting antenna;

wherein output of the transmitting antenna due to beam current convection is enhanced by virtue of an electromagnetic wave that is radiated from conduction current in each of the first and second conducting wires.

18. A transmitting antenna according to claim 17, wherein the first and second spherical balls are coated with a high-breakdown-voltage dielectric.

19. A transmitting antenna according to claim 17, further comprising:

a first shielding cup covering the collector of the first vacuum tube and the charged particle beam gun of the second vacuum tube; and a second shielding cup covering the collector of the second vacuum tube and the charged particle beam gun of the first vacuum tube.

20. A transmitting antenna according to claim 19, wherein the first and second shielding cups are coated with a high-breakdown-voltage dielectric.

* * * * *